United States Patent
Mason

(10) Patent No.: US 7,433,466 B2
(45) Date of Patent: *Oct. 7, 2008

(54) RADIO HANDSET

(75) Inventor: Mark Robert Mason, Hertfordshire (GB)

(73) Assignee: Nokia Mobile Phones Limited, Espoo (FI)

( * ) Notice: Subject to any disclaimer, the term of this patent is extended or adjusted under 35 U.S.C. 154(b) by 855 days.

This patent is subject to a terminal disclaimer.

(21) Appl. No.: 10/931,133

(22) Filed: Aug. 30, 2004

(65) Prior Publication Data

US 2005/0025310 A1 Feb. 3, 2005

Related U.S. Application Data

(63) Continuation of application No. 08/915,995, filed on Aug. 21, 1997, now Pat. No. 6,785,386, and a continuation-in-part of application No. 29/074,181, filed on Jul. 25, 1997, now Pat. No. Des. 405,752, and a continuation-in-part of application No. 29/074,182, filed on Jul. 25, 1997, now Pat. No. Des. 405,048, which is a continuation-in-part of application No. 29/067,200, filed on Feb. 21, 1997, now Pat. No. Des. 392,967, and a continuation-in-part of application No. 29/067,199, filed on Feb. 21, 1997, now Pat. No. Des. 407,368, and a continuation-in-part of application No. 29/066,791, filed on Feb. 21, 1997, now Pat. No. Des. 407,088.

(30) Foreign Application Priority Data

May 2, 1997 (GB) ................................. 9708951.0

(51) Int. Cl.
*H04M 1/00* (2006.01)
*H04M 9/00* (2006.01)

(52) U.S. Cl. ............................. 379/433.01; 379/428.01

(58) Field of Classification Search ............ 379/428.01, 379/433.01–433.08, 434; 455/90.3, 575.1; D14/138, 147, 248
See application file for complete search history.

(56) References Cited

U.S. PATENT DOCUMENTS

| 3,792,205 | A | 2/1974 | O'Dea .................... 379/433.01 |
| 4,335,280 | A | 6/1982 | Butchko .................... 179/90 R |
| D289,896 | S | 5/1987 | Martensson et al. .......... D14/53 |
| D299,719 | S | 2/1989 | Martensson et al. ........ D14/138 |
| D302,423 | S | 7/1989 | Martensson et al. ........ D14/138 |
| 4,945,633 | A | 8/1990 | Hakanen et al. ................ 29/825 |
| 5,036,432 | A | 7/1991 | Uronen et al. ............... 361/422 |
| 5,045,973 | A | 9/1991 | Saarela et al. ................ 361/395 |
| D320,984 | S | 10/1991 | Tattari ........................ D14/138 |
| D325,576 | S | 4/1992 | Pitkonen .................... D14/138 |
| D325,577 | S | 4/1992 | Karlin ........................ D14/138 |

(Continued)

FOREIGN PATENT DOCUMENTS

EP 0 156 297 10/1985

(Continued)

*Primary Examiner*—Curtis Kuntz
*Assistant Examiner*—Tuan D Nguyen
(74) *Attorney, Agent, or Firm*—Harrington & Smith, PC

(57) ABSTRACT

A rear cover of a radio handset having a scooped recess for improving the ergonomics of the phone for single-handed operation.

11 Claims, 4 Drawing Sheets

U.S. PATENT DOCUMENTS

| | | | |
|---|---|---|---|
| D326,262 S | 5/1992 | Soren et al. | D14/138 |
| D334,926 S | 4/1993 | Hunt et al. | D14/138 |
| 5,239,700 A | 8/1993 | Guenther et al. | 455/158.4 |
| D339,338 S | 9/1993 | Tattari et al. | D14/138 |
| D341,138 S | 11/1993 | Cummings | D14/138 |
| D345,734 S | 4/1994 | Seymour et al. | D14/138 |
| D347,220 S | 5/1994 | Katoh | D14/138 |
| D349,112 S | 7/1994 | Tattari | D14/138 |
| 5,332,322 A | 7/1994 | Gambaro | 400/489 |
| D352,708 S | 11/1994 | Rossi | D14/138 |
| D353,807 S | 12/1994 | White | D14/138 |
| D353,809 S | 12/1994 | Nuovo et al. | D14/138 |
| D354,284 S | 1/1995 | White | D14/138 |
| 5,383,091 A | 1/1995 | Snell | 361/679 |
| D355,184 S | 2/1995 | Yokonchi | D14/138 |
| D356,561 S | 3/1995 | Berry | D14/138 |
| D356,562 S | 3/1995 | Nuovo | D14/138 |
| D356,563 S | 3/1995 | Berry | D14/138 |
| D359,283 S | 6/1995 | Rudkiewicz | D14/149 |
| D361,328 S | 8/1995 | White | D14/138 |
| D361,762 S | 8/1995 | Berry | D14/138 |
| D364,620 S | 11/1995 | Prior et al. | D14/147 |
| D374,006 S | 9/1996 | Tattari | D14/138 |
| D374,007 S | 9/1996 | Tattari | D14/138 |
| D380,751 S | 7/1997 | Williams | D14/138 |
| D391,253 S | 2/1998 | Meyer | D14/138 |
| D392,283 S | 3/1998 | Giordano, Jr. et al. | D14/138 |
| 5,768,369 A | 6/1998 | Zoiss et al. | 379/433 |
| D398,925 S | 9/1998 | Wicks | D14/138 |
| 5,898,932 A | 4/1999 | Zurlo et al. | 455/573 |

FOREIGN PATENT DOCUMENTS

| | | |
|---|---|---|
| GB | 2 255 471 | 11/1992 |
| GB | 2 303 018 | 2/1997 |

RADIO HANDSET

CROSS REFERENCE TO RELATED APPLICATIONS

This is a continuation of U.S. patent application Ser. No. 08/915,995 filed Aug. 21, 1997, now U.S. Pat. No. 6,785,386, which is a continuation-in-part patent application of U.S. patent application Ser. No. 29/067,200 filed Feb. 21, 1997, now U.S. Pat. No. Des. 392,967, and a continuation-in-part patent application of U.S. patent application No. 29/067,199 filed Feb. 21, 1997, now U.S. Pat. No. Des. 407,368, and a continuation-in-part patent application of U.S. patent application Ser. No. 29/066,791 filed Feb. 21, 1997, now U.S. Pat. No. Des. 407,088, and a continuation-in-part patent application of U.S. patent application Ser. No. 29/074,181 filed Jul. 25, 1997, now U.S. Pat. No. Des. 405,752, and a continuation-in-part patent application of U.S. patent application Ser. No. 29/074,182 filed Jul. 25, 1997, now U.S. Pat. No. Des. 405,048, which are all hereby incorporated by reference in their entireties.

BACKGROUND OF THE INVENTION

The invention relates to a radio handset and user interface thereto.

The user interface, ie those elements of the handset that interact with the user is of vital importance. Important user interface considerations include, the ease with which the phone can be operated, the ease with which it can be transported and the comfort of use.

In the past, emphasis has been placed on designing the front of a handset, making it smaller and designing relatively large displays that allow information to be clearly presented to a user. As handsets become smaller they are better adapted for single hand operation. With this comes a range of other considerations.

Single handed operation or a radio telephone has clear advantages. These can only be realised effectively if the user finds it comfortable to operate the telephone when it is held in one hand. As modern phones are becoming increasingly small it is for the phone designer to assist in design of the phone to promote single handed operation.

SUMMARY OF THE INVENTION

In accordance with the present invention there is provided a housing component providing at least part of the rear cover of a radio handset having a front operating face including an earpiece, the component being configured to allow a laterally constrained indentation to be formed in the assembled rear cover dipping below a horizon defined by banks of the indentation which are located towards the sides of the radio telephone.

The indentation in the rear of the phone can be used to comfortably accommodate one or more of the user's fingers when the handset is placed to the user's ear in conversation or held in the hand for dialling or other data input. As such it can be considered to be part of the user interface.

The bank surrounding the indentation is preferably arranged to support the radio handset with stability against lateral rotation on a generally planar surface. This allows the handset to be also used in the alternative for entering data via a key pad located on the operating face when not hand held.

The location of an indentation in the rear of the phone can be used to promote a desired orientation of a handset in use. By designing the indentation to be suitably sized to comfortably accommodate one or more fingers of the user's hand, the user, who is likely to hold the handset in the most comfortable position, can be encouraged to hold the radio telephone at an optimum orientation.

The indentation is preferably located towards the end of the phone containing the earpiece/speaker to support the digits of the user's hand when holding the handset to the ear.

BRIEF DESCRIPTION OF THE DRAWINGS

The invention will now be described in greater detail with reference to FIGS. 1 to 6 of the drawings of which.

DETAILED DESCRIPTION OF THE INVENTION

Figure 1:
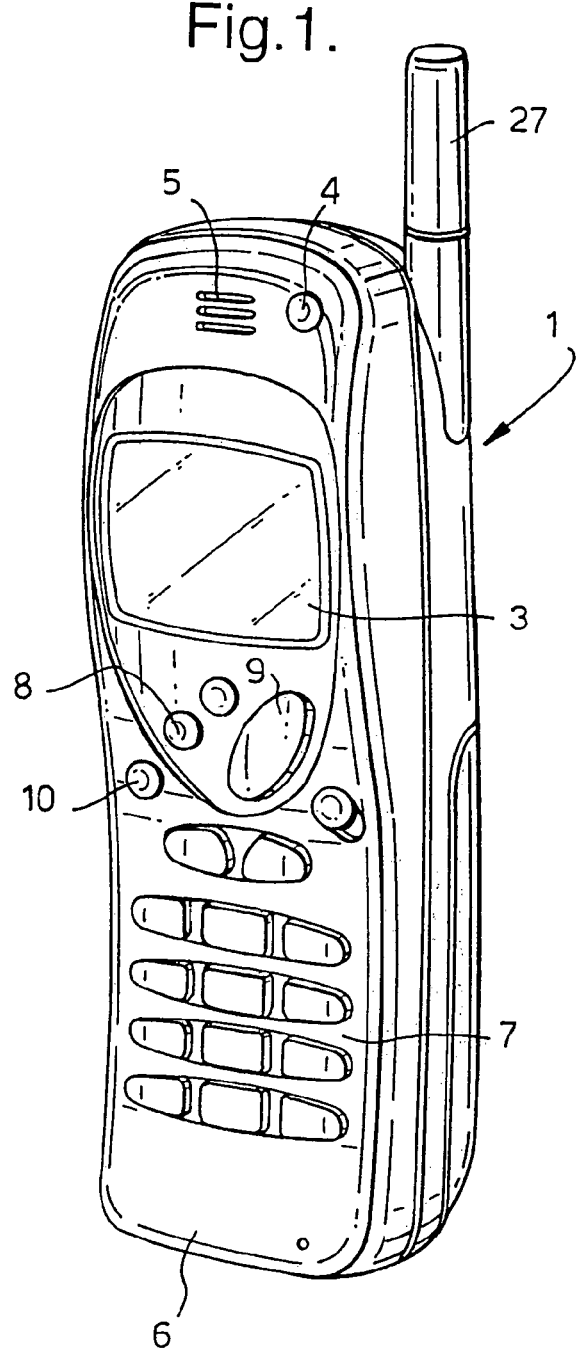
FIG. 1 is a perspective view of a radio handset.

FIG. 1 shows a handset 1 according to an embodiment of the invention. The handset 1 comprises a user interface having a keypad 7, a display 3, an on/off button 4, an earpiece 5, and a microphone 6. The keypad has a first group 7 of keys in the form of alpha-numerical keys, by means of which the user can enter a telephone number, write a text message (SMS), write a name (associated with the telephone number), etc. The user uses the first group of keys primarily for entering data in the telephone (enter events).

The keypad additionally comprises a second group of keys which, in this embodiment, comprises an operation key 8 or soft key whose function depends on the present state of the telephone. The default function or the present function of the operation key 8 is displayed in a predetermined area of the display 3. The second group of keys additionally comprises a scroll key 9 by means of which the user can scroll selectively from one item to the preceding or the succeeding item in the menu loop of the telephone, while he gets access to a sub-menu loop under the item concerned in the main menu loop by activation of the operation key. The clear key 10 may be used e.g. for erasing the digit or letter entered last by brief depression, while depression of a longer duration will erase the entire number or word.

The handset may be used in connection with telephone networks, such as GSM and AMPS cellular networks and various forms of cordless telephone systems. A microphone records the user's speech, and the analog signals formed thereby are A/D converted in an A/D converter before the speech is encoded in an audio codec unit. The encoded speech signal is transferred to a physical layer processor, which, for example, supports the GSM terminal software. The processor also forms the interface to the peripheral units of the apparatus, including the display and the keypad (as well as SIM, data, power supply, RAM, ROM, etc.). The processor communicates with an RF part via a baseband converter and a channel equalizer. The audio codec unit speech-decodes the signal, which is transferred from the processor to an earpiece via a D/A converter.

Figure 2:
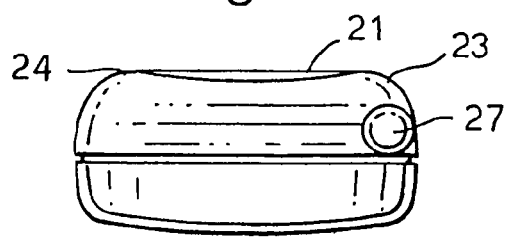
FIG. 2 is a top plan view of the handset of FIG. 1.
Figure 4:
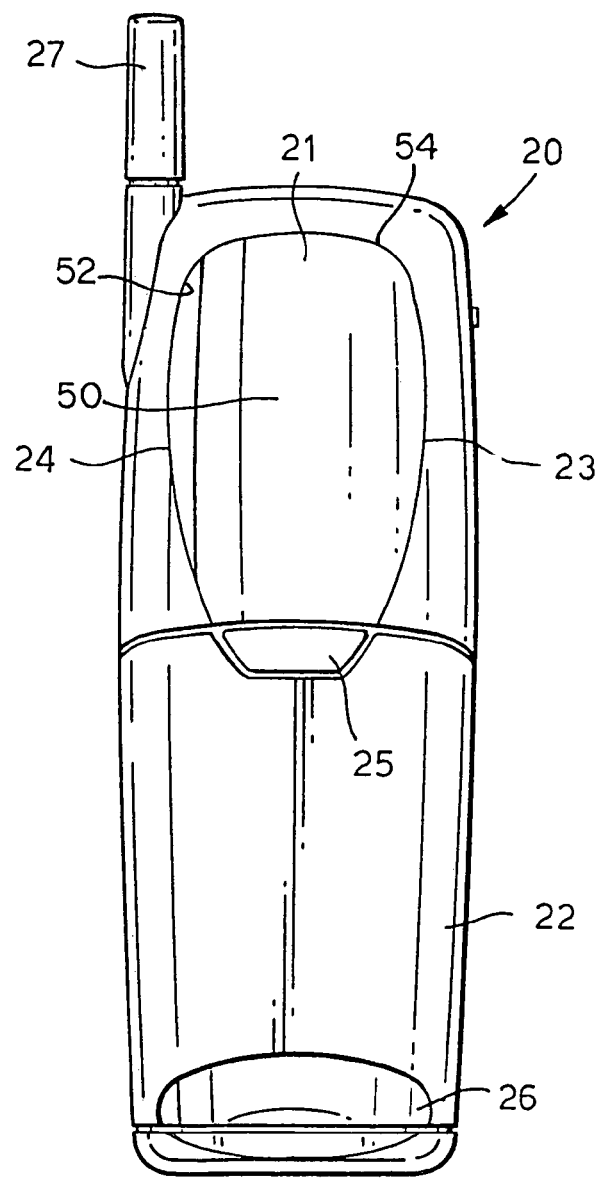
FIG. 4 is a rear view of the handset of FIG. 1.
Figure 5:
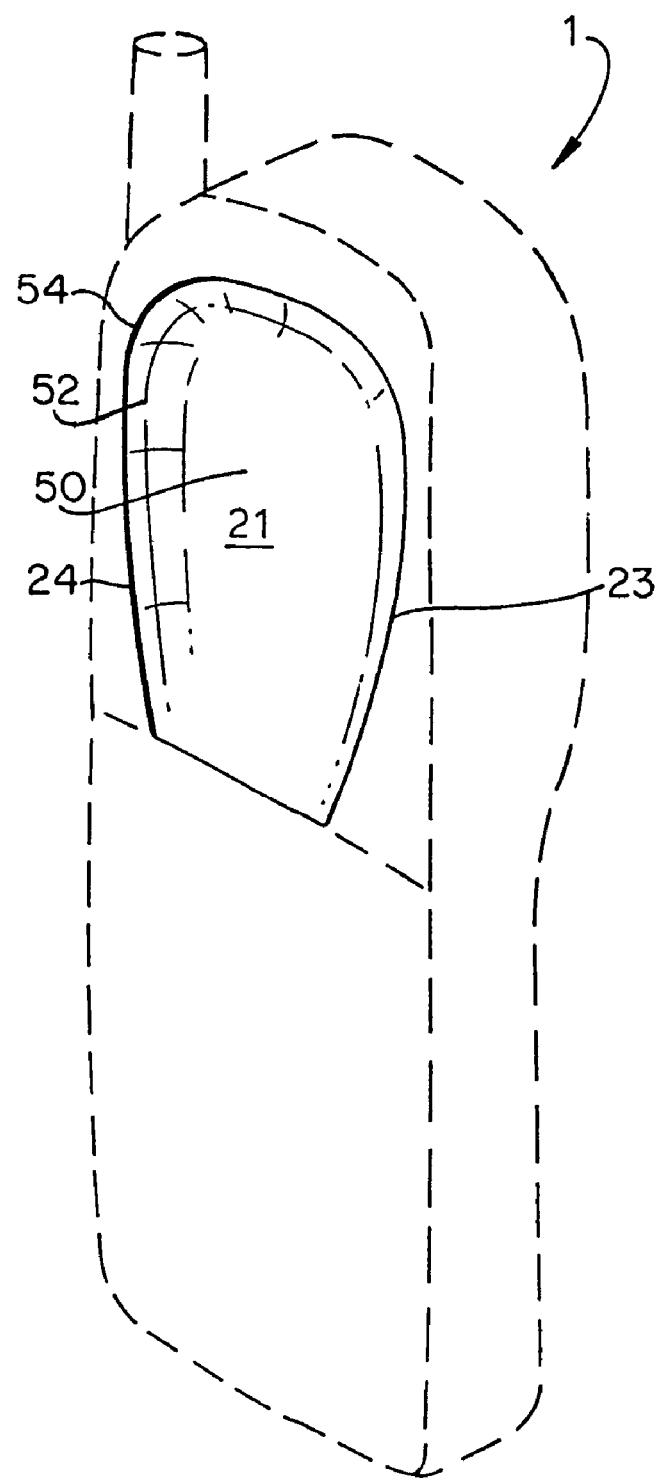
FIG. 5 shows the scooped recess of FIG. 1 in perspective.

The rear cover 20 of the handset 1 is depicted in FIGS. 2, 4 and 5. A scooped recess 21 can clearly be seen located above a battery pack 22 and extending toward the top of the rear cover of the handset 1. The scooped recess 21 is positioned substantially behind the handset's display 3 and in a position arranged to comfortably accommodate the user's fingers when the earpiece 5 of the handset is held to the user's ear.

The scoop is lateral confined by banks 23, 24 within the margins of the rear cover of the handset. The addition of a scooped recess encourages the user to hold the phone in a particular way as the feel of the phone in the hand is enhanced if one of more of the the user's fingers are placed in the scooped recess. The position of the scoop can be used to encourage the user to hold the handset in a predetermined manner which can be used to enhance the operating characteristics of the radio handset particularly those related to single-handed operation of the handset.

As can be seen best in FIGS. 4 and 5, the scooped recess 21 comprises curved walls 52. The curved walls 52 are part of the recessed surface area 50 which forms the scooped recess 21 at the junction 54 of the banks 23, 24 with the recessed surface area 50. As noted above, the scooped recess encourages the user to hold the phone in a particular way. The feel of the phone in the hand is enhanced if one or more of the user's fingers are placed in the scooped recess. As noted above, the scooped recess 21 comfortably accommodates the user's fingers.

The scooped recess improves the ergonomics of the handset. Such positioning enables the handset to be operated more comfortably by the user. It is particularly agreeable to hold the handset in one hand and operate the keys with the thumb. The natural position the hand is inclined to take when nestling a handset with a scooped recess in accordance with an embodiment of the present invention means that the alphanumeric keys and in particular the scroll key are within reach for the user's thumb as it moves naturally across the front face of the phone. No unnatural extension of the thumb along a vertical axis is required to operate the scroll key. Also, the depression of the scroll key only requires movement of the thumb from its socket and does not require any other hand movement. Hence, the handset can be held and readily operated using the same hand.

The positioning of the scroll key 9 obliquely improves the ergonomics of the handset. Such positioning enables the key to be operated more comfortably by the user. It is particularly agreeable as the two depressible elements of the scroll key are within reach of the user's thumb as it moves naturally across the front face of the phone. No unnatural extension of the thumb along a vertical axis is required. Also, the depression of these elements of the scroll key 9 only requires movement of the thumb from its socket and does not require any other hand movement. Hence, the handset can be held and the scroll key readily operated using the same hand.

Figure 7:
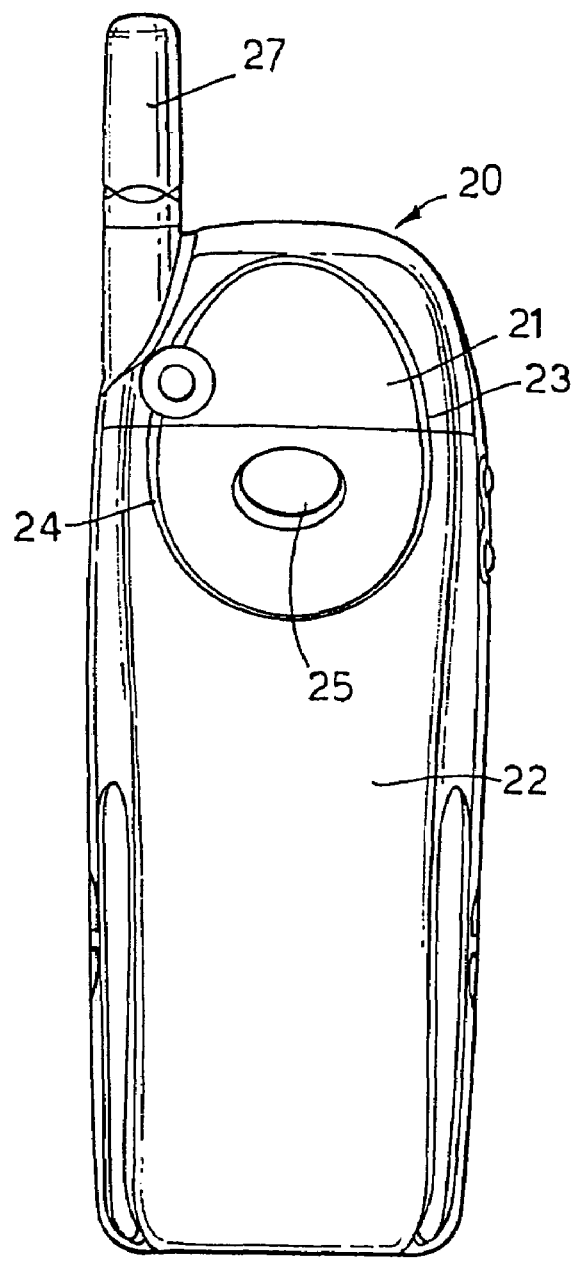
FIG. 7 is a rear view of another embodiment of the invention.
Figure 8:
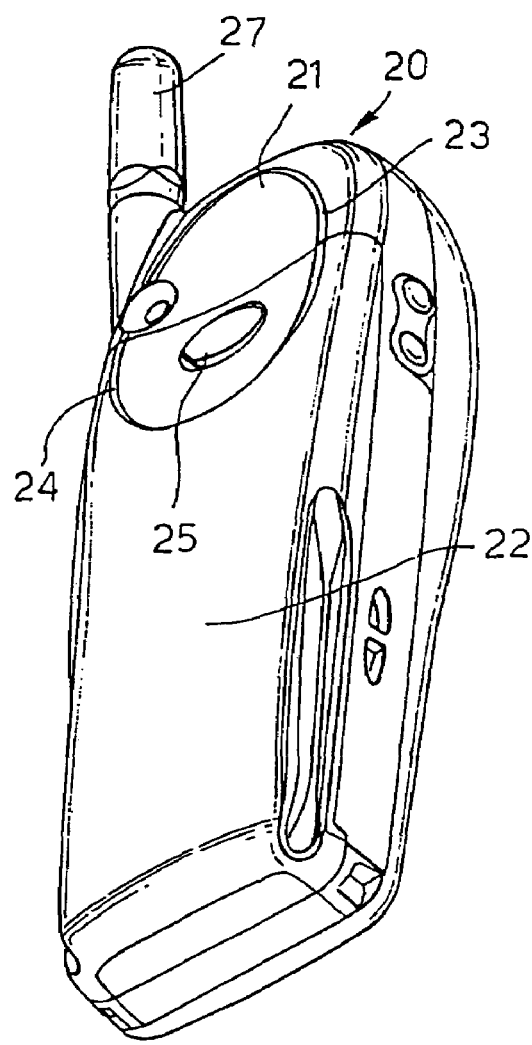
FIG. 8 is a perspective view of the rear of the handset of FIG. 7.

Although depicted in this embodiment located directly above the battery of the handset, the scooped recess 21 could, in other embodiments, be formed at least partly by the rear casing of the battery. The scooped recess 21 could be larger or smaller than that depicted in figures 4 and 6. Such an embodiment is illustrated in figures 7 and 8 of the drawings in which like features are designated with like numerals. The design and position of the recess is not critical, it is desirably, however, configured to accommodate finger tips of a user when holding the radio handset 1 to the ear during conversation. The position directly above the battery 22, especially if the battery catch 25 is placed at its upper extreme as illustrated in figure 4, makes it easier for the user to depress any release mechanism for withdrawal of the battery.

The rear case surrounding the scooped recess 21 including the banks 23 and 24 is configured, for convenience to avoid lateral rocking or listing when the handset 1 is placed rear cover downmost on a generally flat surface.

This ensures that data entry, can also be conveniently effected when the handset is placed on, for example, a desk if not hand held.

To further ergonomic advantage, a second recess 26 is located towards the base of the rear cover of the handset as an alternative addition to the scooped recess at towards the top of the rear casing. This recess neatly nestles the user's palm pad at the base of the thumb promoting extra comfort when the user is operating the handset with one hand and therefore encourages this mode of operation of the handset. In combination with the scooped recess 21, this feature can have a significant effect on the natural operating position of the handset when held by a user and can, accordingly, promote a preferred position of the handset in the hand to promote single handed operation or perhaps directionality of an antenna 27.

The second recess 26 in the embodiment illustrated is generally wider laterally and shorter longitudinally than the scooped recess 21 positioned towards the top of the rear cover of the handset 1. In this embodiment, the second recess is formed partly from the profile of the housing of the battery pack 22, although in other embodiments, all or none of the second recess may be formed in the profile of the casing of the battery pack 22. The second recess 26 is seen in more detail with reference to FIG. 6.

Figure 3:
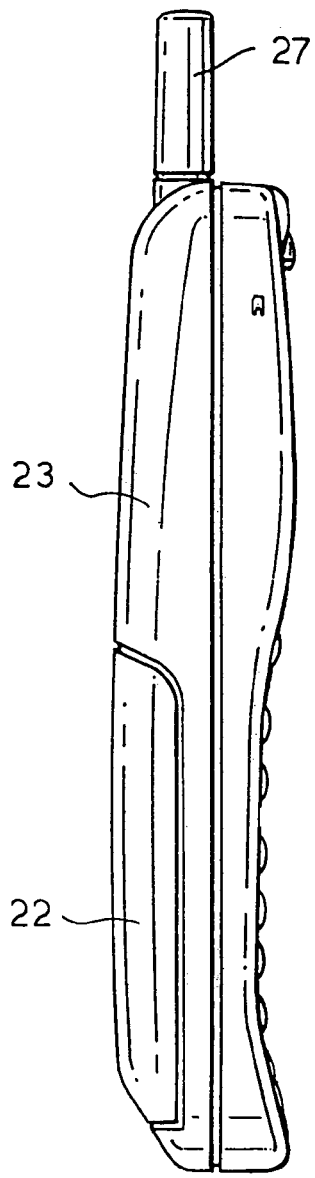
FIG. 3 is a side view of the radio handset of FIG. 1.
Figure 6:
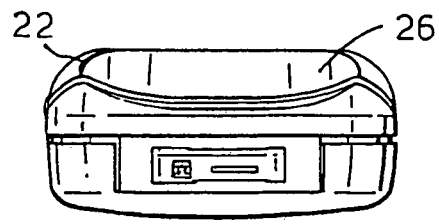
FIG. 6 is a bottom plan view of the handset of FIG. 1.

The configuration of the scooped recess for this embodiment can be more clearly seen with reference to FIGS. 2, 3 and 6. The top of the scooped recess can clearly be seen in FIG. 2 allowing some longitudinal rocking of the handset when placed on, for example, a table. The rear cover surrounding the recess could, however be configured to maintain the handset against both lateral and longitudinal listing. The banks of the recess defining its lateral extent can also clearly be seen in FIG. 2. From FIG. 3 it is clear that the recess of this embodiment cannot be seen in side profile promoting the lateral stability of the handset when placed on a planar surface.

The present invention includes any novel feature or combination of features disclosed herein either explicitly or any generalisation thereof irrespective of whether or not it relates to the claimed invention or mitigates any or all of the problems addressed.

In view of the foregoing description it will be evident to a person skilled in the art that various modifications may be made within the scope of the invention.

What is claimed is:

1. An electronic device housing providing at least a portion of a cover for an electronic device, the electronic device having a front operating face including an earpiece section and a microphone section, the housing at least partially forming a rear side of the cover and comprising a recessed surface at least partially constrained by at least one bank at a junction of the bank with the recessed surface, the recessed surface being sized and positioned so as to receive and support a plurality of fingers of a user to properly orient the electronic device relative to a user's ear during a telephone call with the electronic device, wherein the recessed surface extends across a majority of a width of the housing for receiving the plurality of fingers, and wherein the recessed surface forms an open finger contact surface for the fingers.

2. An electronic device housing as in claim 1 wherein the housing comprise a rear casing of a battery and a rear cover member of the housing.

3. A telephone handset housing providing at least a portion of a cover of a telephone handset, the telephone handset having a front operating face including an earpiece and a microphone, the housing at least partially forming a rear side of the cover and comprising a recess at least partially constrained by banks at a junction of the recess with the banks, the recess being sized and positioned so as to receive and support fingers of a user, wherein the recess extends across a majority of a width of the rear side and the recess is sized and positioned to receive and support a plurality of the fingers of the user to properly orient the telephone handset during a telephone call, and wherein the recess comprises a finger contact surface bordered by the banks which extends across an entire width of the recess, the finger contact surface being open for the fingers of the user to contact.

4. A telephone handset housing as in claim 3 wherein the housing comprise a rear casing of a battery and a rear cover member of the housing.

5. An electronic device housing providing at least a portion of a cover of an electronic device, the electronic device having a front operating face including an earpiece section and a keypad, the housing at least partially forming a rear side of the cover and comprising a recessed surface area at least partially surrounded by a bank area of the cover with at least one curved wall at a junction of the bank area with the recessed surface area, the recessed surface area extending across a majority of a width of the rear side of the cover, wherein the recessed surface area is sized and shaped such that a finger of a user is adapted to be supported in the recessed surface area adjacent the bank area along the curved wall to properly orient the electronic device during use with the earpiece section proximate an ear of the user, and wherein the recessed surface area comprises a finger contact surface which extends across a majority of a width of the recessed surface area and is open to allow the fingers of the user to contact any area on the finger contact surface.

6. An electronic device housing as in claim 5 wherein the housing comprise a rear casing of a battery and a rear cover member of the housing.

7. An electronic device housing providing at least a portion of a cover for an electronic device, the electronic device having a front operating face including an earpiece section, the housing at least partially forming a rear side of the cover and comprising a recessed surface at least partially constrained by at least one relatively raised bank at a junction of the bank with the recessed surface, the recessed surface being sized and positioned so as to receive and support a finger of a user at a plurality of different locations to properly orient the earpiece section of the electronic device relative to a user's ear during a telephone call with the electronic device, wherein the recessed surface extends across a majority of a width of the housing for receiving the finger at any one of the plurality of different locations on the recessed surface, wherein the recessed surface forms an open finger contact surface for the finger.

8. An electronic device housing as in claim 7 wherein the housing comprise a rear casing of a battery and a rear cover member of the housing.

9. An apparatus housing providing at least a portion of a cover for an apparatus, the apparatus having a front operating face including a user output device, the housing at least partially forming a rear side of the cover and comprising a recessed surface at least partially constrained by at least one bank at a junction of the bank with the recessed surface, the recessed surface being sized and positioned so as to receive and support a plurality of fingers of a user to properly orient the apparatus relative to a user during use, wherein the recessed surface extends across a majority of a width of the housing for receiving the plurality of fingers, and wherein the recessed surface forms an open finger contact surface for the fingers.

10. An apparatus as claimed in claim 9 wherein the user output device is a display.

11. An apparatus as claimed in claim 9 wherein the user output device is an earpiece.

* * * * *